(12) United States Patent
Nakaji et al.

(10) Patent No.: US 11,161,543 B2
(45) Date of Patent: Nov. 2, 2021

(54) WORK VEHICLE HAVING A HYDRAULIC CIRCUIT

(71) Applicant: Kubota Corporation, Osaka (JP)

(72) Inventors: Masaru Nakaji, Sakai (JP); Takeshi Tsuchiya, Sakai (JP)

(73) Assignee: Kubota Corporation, Osaka (JP)

(*) Notice: Subject to any disclaimer, the term of this patent is extended or adjusted under 35 U.S.C. 154(b) by 176 days.

(21) Appl. No.: 16/693,773

(22) Filed: Nov. 25, 2019

(65) Prior Publication Data

US 2020/0247467 A1 Aug. 6, 2020

(30) Foreign Application Priority Data

Feb. 5, 2019 (JP) .............................. JP2019-018982

(51) Int. Cl.
*B62D 5/07* (2006.01)
*B60P 1/16* (2006.01)
*F15B 1/02* (2006.01)
*F15B 7/00* (2006.01)

(52) U.S. Cl.
CPC ............... *B62D 5/07* (2013.01); *B60P 1/162* (2013.01); *F15B 1/02* (2013.01); *F15B 7/001* (2013.01)

(58) Field of Classification Search
CPC ............ B62D 5/07; B60P 1/162; F15B 7/001
See application file for complete search history.

(56) References Cited

U.S. PATENT DOCUMENTS

| 5,927,072 A | * | 7/1999 | Vannette | .................. B60T 8/18 60/452 |
| 7,464,545 B2 | * | 12/2008 | Vigholm | .................. B62D 5/07 60/422 |
| 2008/0209903 A1 | * | 9/2008 | Itoga | ...................... E02F 9/225 60/471 |

FOREIGN PATENT DOCUMENTS

| JP | S5893633 A | 6/1983 |
| JP | 2508487 Y2 * | 8/1996 |

* cited by examiner

*Primary Examiner* — Thomas E Lazo
(74) *Attorney, Agent, or Firm* — The Webb Law Firm

(57) ABSTRACT

A work vehicle includes a bypass passage formed in an operational valve of a dump cylinder and configured to feed pressure oil from a hydraulic pump to a power steering device when the operational valve is under a neutral state and an oil feeding passage equipped with an orifice, the orifice-equipped oil feeding passage being configured to feed the pressure oil from the hydraulic pump to a rod side oil chamber of the dump cylinder when the operational valve is under the neutral state.

2 Claims, 4 Drawing Sheets

WORK VEHICLE HAVING A HYDRAULIC CIRCUIT

CROSS-REFERENCE TO RELATED APPLICATION

This application claims priority to Japanese Patent Application No. 2019-018982 filed Feb. 5, 2019, the disclosure of which is hereby incorporated by reference in its entirety.

FIELD OF THE INVENTION

The present invention relates to a work vehicle including a hydraulic power steering device for steering traveling wheels, a vertically pivotable load carrying deck and a hydraulic double-action type dump cylinder operably coupled to the load carrying deck and configured to pivotally elevate the load carrying deck with an expansion action and to pivotally lower the load carrying deck with a contraction action.

BACKGROUND ART

As an example of the work vehicle of the type described above, there is known one having a hydraulic pump for feeding pressure oil to an operational valve of the dump cylinder and a bypass oil passage formed in the operational valve for feeding pressure oil from the hydraulic pump to the power steering device under a neutral state of the operational valve. In this, when the operational valve is under the neutral state, the hydraulic pump feeds pressure oil to the power steering device to enable a steering operation of the traveling wheels by the power steering device and the hydraulic pump for feeding pressure oil to the dump cylinder is used also as a hydraulic pump for feeding pressure oil to the power steering device. As an example of this type, there is a dump type transport vehicle disclosed in Japanese Unexamined Patent Application Sho. 58-93633 publication document. This dump type transport vehicle is equipped with a hydraulic cylinder as a dump cylinder, a three-position switching valve as an operational value, a hydraulic pump for feeding pressure oil to the three-position switching valve, a hydraulic power steering device, and a center bypass passage as a bypass passage.

SUMMARY OF THE INVENTION

Problem to be Solved by Invention

In the case of convention, when a surge pressure is generated in the power steering device such as the case of an operation of the power steering device to its stroke end being effected frequently, even if the operational valve is under the neutral state, the pressure oil leaks within the operational valve and the leaked pressure oil is applied to the dump cylinder. Pressure oil of substantially same strength will be applied to both the bottom side oil chamber and the rod side oil chamber of the dump cylinder. In this, however, as the area of the piston exposed to the pressure oil in the bottom side oil chamber is greater than the area of the piston exposed to the pressure oil in the rod side oil chamber, the sliding operational force received by the piston from the leaked pressure oil in the bottom side oil chamber is stronger than the sliding operational force received by the piston from the leaked pressure oil in the rod side oil chamber, so that the dump cylinder is expanded to elevate the load carrying deck gradually. Namely, depending on the operation of the power steering device, a surge pressure may be developed to elevate the load carrying deck inadvertently.

The present invention provides a work vehicle in which a load carrying deck is not elevated regardless of an operation of the power steering device.

Solution

According to the present invention, there is provided a work vehicle comprising:
- a hydraulic power steering device for steering traveling wheels;
- a vertically pivotable load carrying deck;
- a hydraulic double-action type dump cylinder operably coupled to the load carrying deck and configured to pivotally elevate the load carrying deck with an expansion action and to pivotally lower the load carrying deck with a contraction action;
- a hydraulic pump for feeding pressure oil to an operational valve of the dump cylinder;
- a bypass passage formed in the operational valve and configured to feed pressure oil from the hydraulic pump to the power steering device when the operational valve is under a neutral state; and
- an oil feeding passage equipped with an orifice, the oil feeding passage being configured to feed the pressure oil from the hydraulic pump to a rod side oil chamber of the dump cylinder when the operational valve is under the neutral state.

With the above-described inventive configuration, when the operational valve is under the neutral state, oil pressure from the hydraulic pump is reduced through the oil feeding passage equipped with an orifice (may be referred to as the "orifice-equipped oil feeding passage" hereinafter) and then fed to the rod side oil chamber of the dump cylinder. With this arrangement, even if oil pressure leaked inside the operational valve under its neutral state is applied to the bottom side oil chamber and the rod side oil chamber of the dump cylinder due to development of a surge pressure in the power steering device, a difference between the sliding operational force applied to the piston due to the leaked oil pressure in the bottom side oil chamber and the sliding operational force applied to the piston due to the leaked oil pressure in the rod side oil chamber is cancelled out by the sliding operational force applied to the piston due to the pressure oil in the rod side oil chamber from the oil feeding passage having the orifice. As a result, in spite of leak of oil pressure which may have occurred in the operational valve due to the surge pressure developed in the power steering device, it is possible to prevent an inadvertent expansion action of the dump cylinder due to leak of oil pressure in the operational valve.

When the operational valve is under the neutral state, even in absence of surge pressure development in the power steering device, pressure oil is fed to the rod side oil chamber of the dump cylinder via the orifice-equipped oil feeding passage. However, since oil discharge from the bottom side oil chamber is disabled as the operational valve blocks the operational oil passage connecting between the operational valve and the bottom side oil chamber, no action of the dump cylinder occurs due to the pressure oil fed to the rod side oil chamber of the dump cylinder via the orifice-equipped oil feeding passage. Namely, no movement of the load carrying deck occurs.

Accordingly, even if the power steering device is operated either under a state of surge pressure development or a state of no surge pressure development, no movement of the load carrying deck occurs.

In the present invention, preferably, the orifice-equipped oil feeding passage is formed in the operational valve to connect the bypass passage with a cylinder port of the operational valve when the operational valve is under the neutral state.

With the above-described inventive configuration, it is possible to obtain a work vehicle whose load carrying deck is not elevated due to development of a surge pressure in the power steering device, while realizing its hydraulic circuit by the simple arrangement of forming the orifice-equipped oil feeding passage in the operational valve.

EMBODIMENT

An embodiment as an example of the present invention will be explained with reference to the accompanying drawings.

Figure 1:
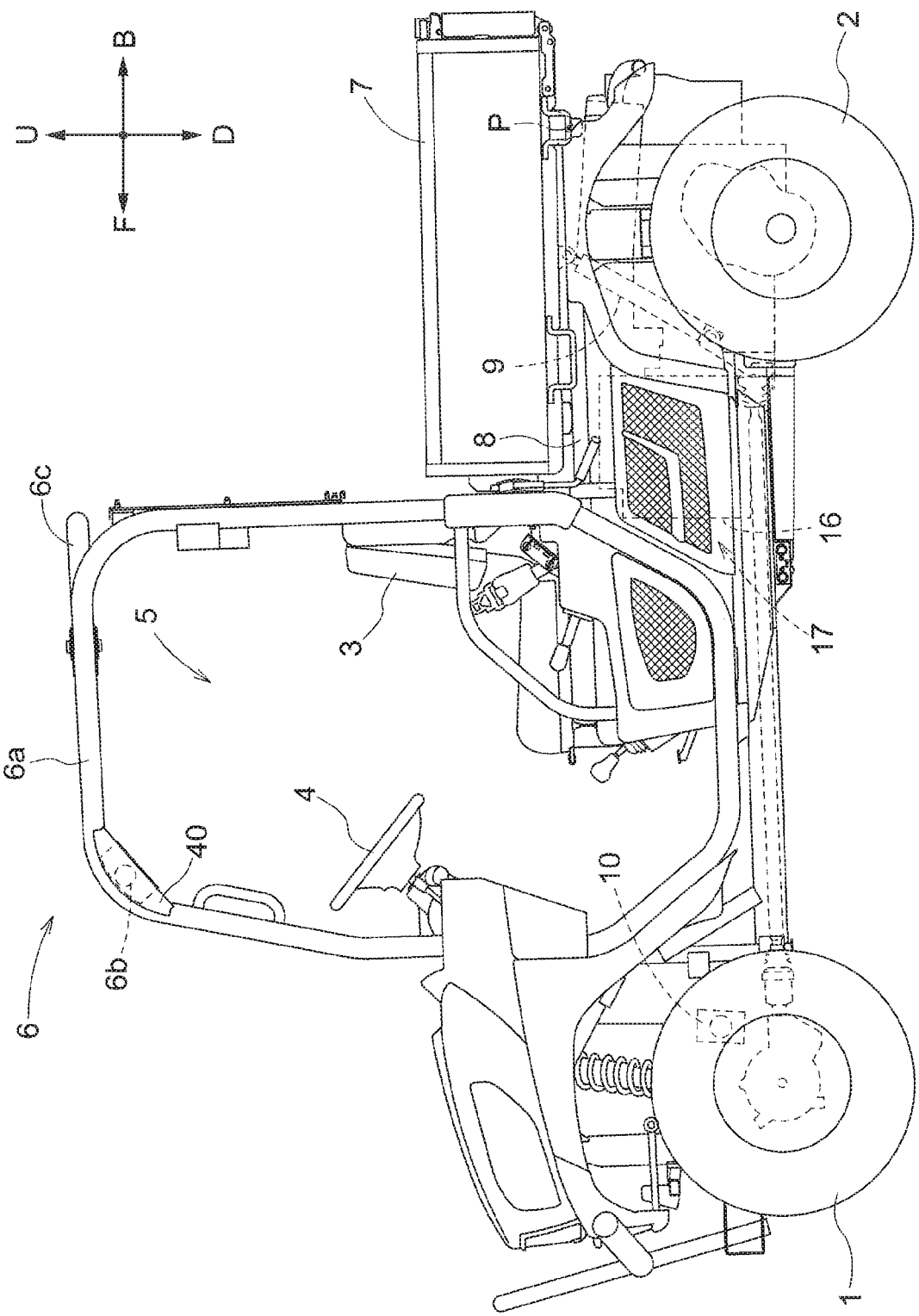
FIG. 1 is a left side view showing a multi-purpose work vehicle in its entirety.

Incidentally, in the following explanation, with respect to a traveling vehicle body of a multi-purpose work vehicle, the direction denoted with an arrow F in FIG. 1 is defined as the "vehicle body front side", the direction denoted with an arrow B is defined as the "vehicle body rear side", the direction denoted with an arrow U is defined as the "vehicle body upper side", the direction denoted with an arrow D is defined as the "vehicle body lower side". The direction on the near (front) side of the illustration of FIG. 1 is defined as the "vehicle body left side" and the direction on the far (back) side of the illustration of FIG. 1 is defined as the "vehicle body right side", respectively.

[General Configuration of Multi-Purpose Work Vehicle]

As shown in FIG. 1, a multi-purpose work vehicle includes a traveling vehicle body which mounts a pair of left and right front wheels 1 that are steerable and drivable and a pair of left and right rear wheels 2 that are drivable. At a front portion of the traveling vehicle body, there is formed a driving section 5 having a driver's seat 3 and a steering wheel 4 for steering the front wheels 1. In the driving section 5, there is provided a ROPS 6 which covers the riding space. A steering operation of the front wheels 1 by the steering wheel 4 is carried out by steering the front wheels 1 in correspondence with a rotation of the steering wheel 4 by a power steering device 10 operably coupled to the steering wheel 4 and the front wheels 1. At a rear portion of the traveling vehicle body, there is provided a load carrying deck 7. A rear portion of the load carrying deck 7 and a vehicle body frame 8 of the traveling vehicle body are coupled with each other via a coupling mechanism (not shown) having a coupling axis P that extends along the lateral width direction of the traveling vehicle body. The load carrying deck 7 is supported to the vehicle body frame 8, with a front side portion thereof being vertically pivotable about the coupling axis P as its pivot. The load carrying deck 7 is pivotally liftable up/down between a lowered posture in which the front side portion thereof is lowered to be received and supported by the vehicle body frame 8 from the under side and an elevated posture in which the front side portion thereof is elevated to be upwardly distant from the vehicle body frame 8. To a lower portion of the load carrying deck 7, a dump cylinder 9 is operably coupled. This dump cylinder 9 is configured to elevate the load carrying deck 7 with an expansion action thereof and to lower the load carrying deck 7 with a contraction action thereof. Under the load carrying deck 7, there is provided a prime mover section 17 having an engine 16.

[Arrangement of Driving Device for Dump Cylinder and Power Steering Device]

Figure 2:
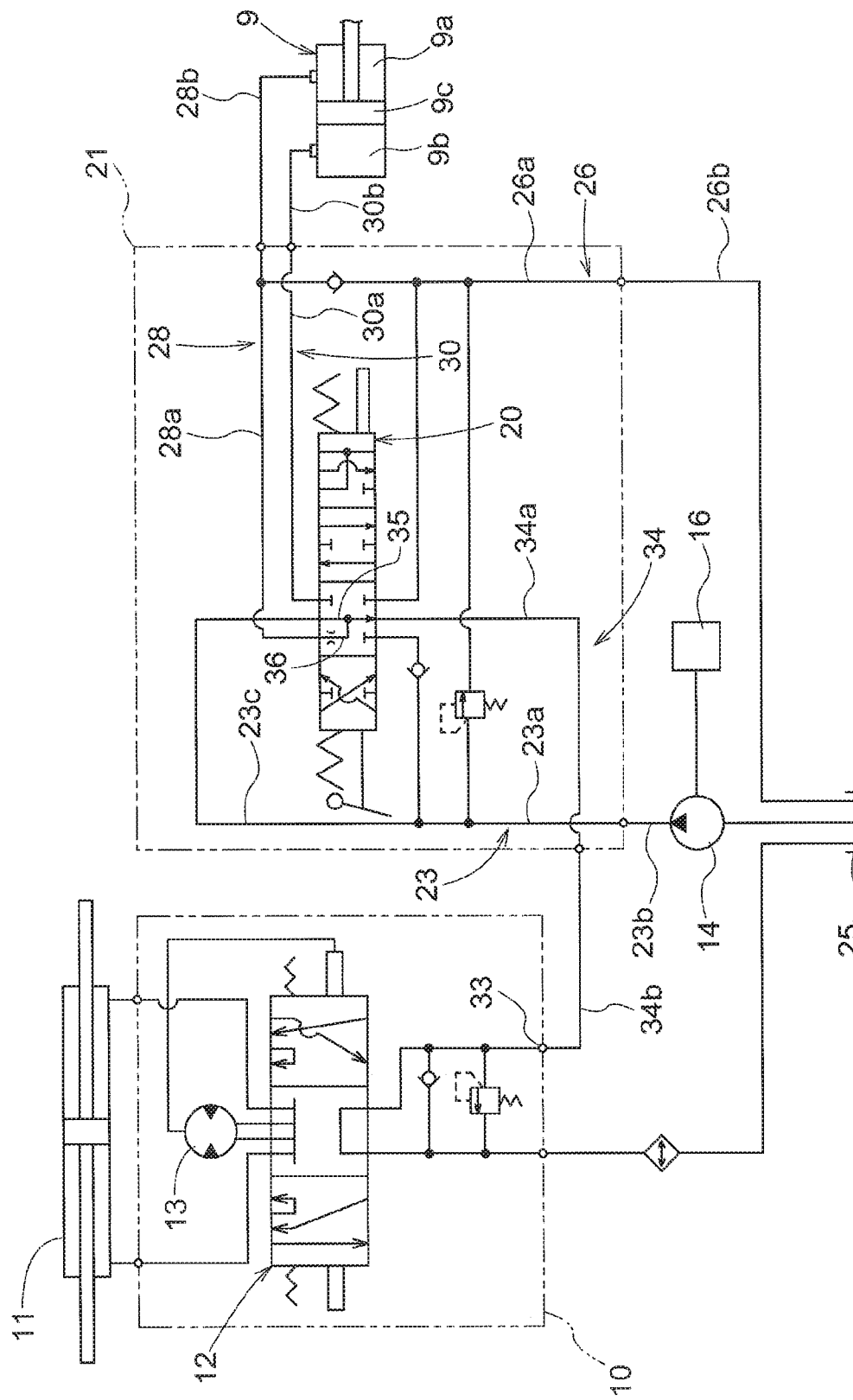
FIG. 2 is a diagram of a hydraulic circuit constituting a driving device of a dump cylinder and a power steering device.

The dump cylinder 9, as shown in FIG. 2, is constituted of a hydraulic double-action type hydraulic cylinder. The power steering device 10, as shown in FIG. 2, includes a power cylinder 11, a control valve 12, and a metering pump 13. This power steering device 10 is constituted of a full hydraulic type power steering device.

Figure 3:
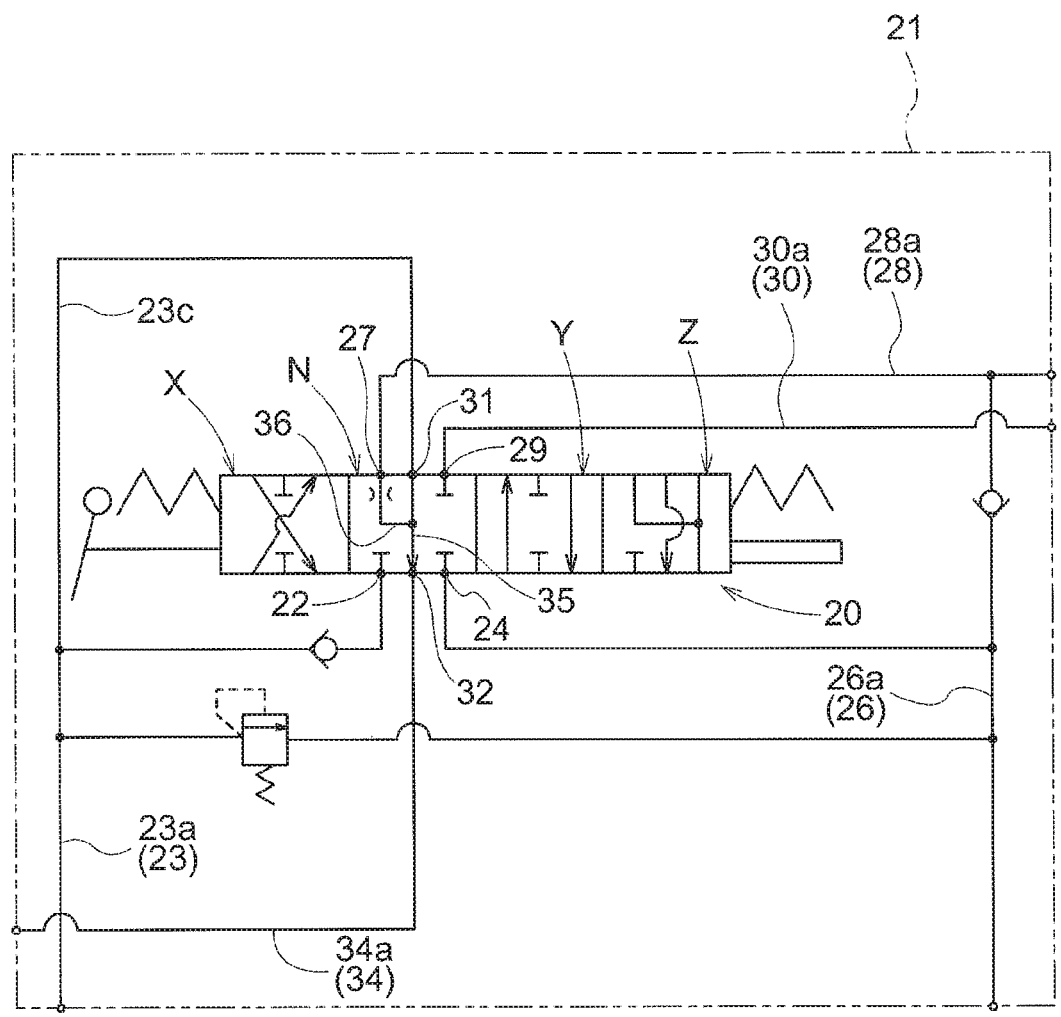
FIG. 3 is a hydraulic circuit diagram of an operational valve unit.

As shown in FIGS. 2 and 3, an operational valve 20 of the dump cylinder 9 is included in an operational valve unit 21. A pump port 22 of the operational valve 20 and a discharge portion of the hydraulic pump 14 are connected to each other via an oil feeding passage 23, so that pressure oil is fed by the hydraulic pump 14 to the pump port 22 of the operational valve 20. The oil feeding passage 23 includes an oil feeding passage portion 23a formed inside the operational valve unit 21 and an oil feeding passage portion 23b formed outside the operational valve unit 21. A tank port 24 of the operational valve 20 and a tank 25 are connected to each other via an oil discharging passage 26, thus allowing discharge of pressure oil from the operational valve 20 to the tank 25. The oil discharging passage 26 includes an oil discharging passage portion 26a formed inside the operational valve unit 21 and an oil discharging passage portion 26b formed outside the operational valve unit 21.

As shown in FIGS. 2 and 3, a first cylinder port 27 of the operational valve 20 and a rod side oil chamber 9a of the dump cylinder 9 are connected to each other via a first operational oil passage 28, thus allowing feeding of pressure oil from the operational valve 20 to the rod side oil chamber 9a and discharging of pressure oil from the rod side oil chamber 9a to the operational valve 20. The first operational oil passage 28 includes an operational oil passage portion 28a formed inside the operational valve unit 21 and an operational oil passage portion 28b formed outside the operational valve unit 21. A second cylinder portion 29 of the operational valve 20 and a bottom side oil chamber 9b of the dump cylinder 9 are connected to each other via a second operational oil passage 30, thus allowing feeding of pressure oil from the operational valve 20 to the bottom side oil chamber 9b and discharging of pressure oil from the bottom side oil chamber 9b to the operational valve 20. The second operational oil passage 30 includes an operational oil passage portion 30a formed inside the operational valve unit 21 and an operational oil passage portion 30b formed outside the operational valve unit 21.

As shown in FIGS. 2 and 3, a first bypass port 31 of the operational valve 20 and a branch oil feeding passage 23c branched from the oil feeding passage 23 are connected to each other, so that pressure oil is fed to the first bypass port 31 by the hydraulic pump 14. A second bypass port 32 of the operational valve 20 and an input port 33 of the power steering device 10 are connected to each other via a power steering oil feeding passage 34, so that pressure oil can be fed from the second bypass port 32 to the power steering device 10. Pressure oil can be fed to the power steering device 10 by the hydraulic pump 14. The power steering oil feeding passage 34 includes an oil feeding passage portion 34a formed inside the operational valve unit 21 and an oil feeding passage portion 34b formed outside the operational valve unit 21.

The operational valve 20, as shown in FIG. 3, is configured to be switchable to four kinds of operational states consisting of a neutral state position N, an elevated operational state X, a lowered operational state Y and a floating state Z. As shown in FIGS. 2 and 3, in the operational valve 20, there is formed a bypass passage 35 which establishes connection between the first bypass port 31 and the second bypass port 32, when the operational valve 20 is switched to the neutral state N. In the operational valve 20, there is also formed an orifice-equipped oil feeding passage 36 which establishes connection between the bypass passage 35 and the first cylinder port 27 when the operational valve 20 is switched to the neutral position N.

When the operational valve 20 is switched to the elevated operational state X, the pump port 22 is connected to the second cylinder port 29, so that pressure oil fed to the pump port 22 by the hydraulic pump 14 is fed to the second operational oil passage 30 by the operational valve 20 and fed from this second operational oil passage 30 to the bottom side oil chamber 29b. In association with this, the first cylinder port 27 is connected to the tank port 24, so that the pressure oil of the rod side oil chamber 9a is discharged to the first operational oil passage 28 and then discharged from this first operational oil passage 28 via the operational valve 20 and the oil discharging passage 26 to the tank 25. With this, the dump cylinder 9 is driven to the expansion side by the pressure oil from the hydraulic pump 14. Namely, the load carrying deck 7 is elevated.

When the operational valve 20 is switched to the lowered operational state Y, the pump port 22 is connected to the first cylinder port 27, so that pressure oil fed to the pump port 22 by the hydraulic pump 14 is fed to the first operational oil passage 28 by the operational valve 20 and from this first operational oil passage 28 to the rod side oil chamber 9a. In association therewith, the second cylinder port 29 is connected to the tank port 24, so that the pressure oil of the bottom side oil chamber 9b is discharged to the second operational oil passage 30 and then discharged from this second operational oil passage 30 via the operational valve 20 and the oil discharging passage 26 to the tank 25. With this, the dump cylinder 9 is driven to the contraction side by the pressure oil from the hydraulic pump 14. Namely, the load carrying deck 7 is lowered.

In case the operational valve 20 is switched to the elevated operational state X and the lowered operational state Y, the first bypass portion 31 and the second bypass port 32 respectively is blocked, thus disabling feeding of pressure oil to the power steering device 10 by the hydraulic pump 9, so the power steering device 10 is not operated.

When the operational valve 20 is switched to the neutral state N, as shown in FIG. 3, connection is established between the first bypass port 31 and the bypass passage 35 and connection is established also between the bypass passage 35 and the first cylinder port 27 via the orifice-equipped oil feeding passage 36, so that pressure oil fed to the first bypass port 31 by the hydraulic pump 14 is fed via the bypass passage 35 and the orifice-equipped oil feeding passage 36 to the first operational oil passage 28 and then fed from this first operational oil passage 28 to the rod side oil chamber 9a. However, as the second cylinder port 29 is blocked to disable discharging of pressure oil of the bottom side oil chamber 9b, the dump cylinder 9 is not driven. Namely, the load carrying deck 7 is stopped.

When the operational valve 20 is switched to the neutral state N, as shown in FIG. 3, the first bypass port 31 and the second bypass port 32 are connected to each other via the bypass passage 35, so that pressure oil fed to the first bypass port 31 by the hydraulic pump 14 is fed to the power steering oil feeding passage 34 via the bypass passage 35 and then fed from this power steering oil feeding passage 34 to the power steering device 10. Namely, as the pressure oil is fed to the power steering device 10 by the hydraulic pump 14, an operation of this power steering device 10 is enabled, thus allowing a steering operation of the front wheels 1 by the power steering device 10. In the event of development of a surge pressure in the power steering device 10 which steers the front wheels 1, as this surge pressure affects the operational valve 20, leakage of pressure oil occurs inside the operational valve 20, and leaked pressure oil will flow from the first cylinder portion 27 via the first operational oil passage 28 into the rod side oil chamber 9a and will flow also from the second cylinder port 29 via the second operational oil passage 30 into the bottom side oil chamber 9b, respectively, thus developing an operational force which slides the piston 9c of the dump cylinder 9 in the rod side oil chamber 9a and in the bottom side oil chamber 9b, respectively. And, the operational force generated in the bottom side oil chamber 9b becomes stronger than the operational force generated in the rod side oil chamber 9a. The pressure oil fed to the first bypass port 31 by the hydraulic pump 14 will flow into the orifice-equipped oil feeding passage 36 via the bypass passage 35 and will be reduced through this orifice-equipped oil feeding passage 36 and then fed to the first operational oil passage 28 and from this first operational oil passage 28 to the rod side oil chamber 9a. with this, in this rod side oil chamber 9a, due to the pressure oil fed to the orifice-equipped oil feeding passage 36, there will be generated an operational force that slides the piston 9c. The difference between the sliding operational force generated by the leaked oil pressure in the rod side oil chamber 9a and the sliding operational force generated by the leaked oil pressure in the bottom side oil chamber 9b will be cancelled out by the sliding operational force generated by the pressure oil from the orifice-equipped oil feeding passage 36 in the rod side oil chamber 9a. That is, even if a surge pressure is developed in the power steering device 10, an expansion action of the dump cylinder 9 due to leaked pressure oil of the operational valve 20 attributable to the development of the surge pressure is prevented by feeding of pressure oil by the orifice-equipped oil feeding passage 36.

[Arrangement of ROPS]

The ROPS 6, as shown in FIG. 1, includes side ROPS members 6a provided on the left lateral side portion and the right lateral side portion of the driving section 5, a front coupling ROPS member 6b coupling front upper portions of the left and right side ROPS members 6a to each other and a rear coupling ROPS member 6c coupling rear upper portions of the left and right side ROPS members 6a to each other.

Figure 4:
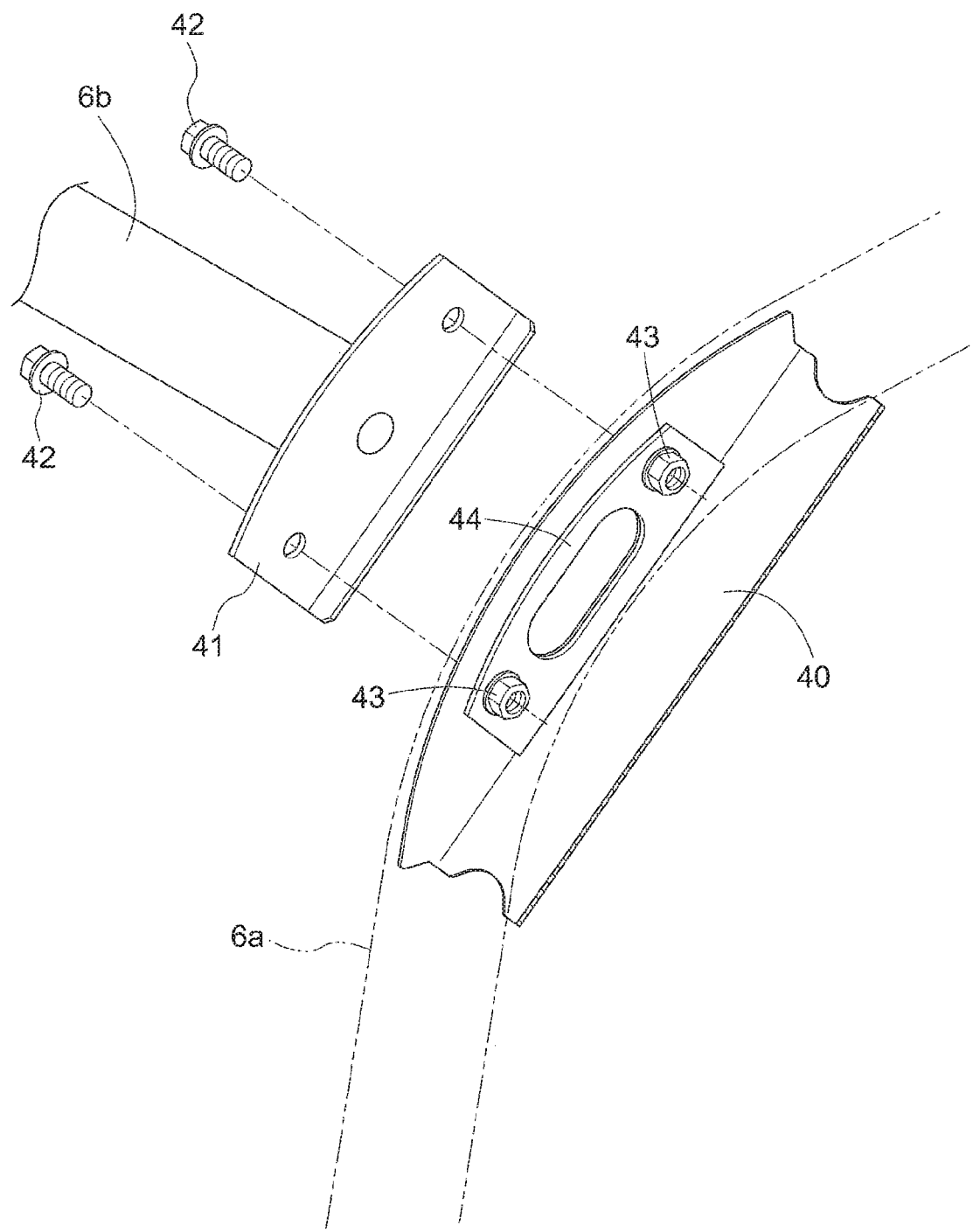
FIG. 4 is a perspective view showing a connection arrangement between a side ROPS member and a front connection ROPS member.

Connection of the front coupling ROPS member 6b to each one of the left and right side ROPS members 6a, as shown in FIG. 4, is provided by fastening and coupling a bracket 40 attached to the side ROPS member 6a to/with a flange portion 41 provided at the terminal end of the front coupling ROPS member 6b with a coupling bolt 42 and a nut 43. The bracket 40 is attached to the side ROPS member 6a by welding. And, a reinforcement plate 44 is attached by welding to the bracket 40. The nut 43 is attached to the reinforcement plate 44 by welding. The coupling bolt 42 is designed to be fastened into the nut 43 by being inserted into the bracket 40 and the reinforcement plate 44 from the side where the flange portion 41 is positioned.

Other Embodiments (1) In the foregoing embodiment, there was disclosed an example in which the load carrying deck 7 is arranged with its front side portion being vertically pivotable. Instead, the load carrying deck may be arranged with its lateral portion being vertically pivotable.

(2) In the foregoing embodiment, there was disclosed an example in which the power steering device 10 is of a full hydraulic type. Instead, the device may be of a linkage type.

(3) In the foregoing embodiment, there was disclosed an example in which the orifice-equipped oil feeding passage 36 is formed in the operational valve 20. Instead, it may be provided outside the operational valve 20.

(4) In the foregoing embodiment, there was disclosed an example in which the front wheels 1 are steerable traveling wheels. Instead, the rear wheels may be configured to be steerable.

(5) The present invention is applicable not only to a multi-purpose work vehicle, but also to a work vehicle having a load carrying deck for carrying out various utility works such as a harvesting work of agricultural produce, etc.

The invention claimed is:

1. A work vehicle comprising:
a hydraulic power steering device for steering traveling wheels;
a vertically pivotable load carrying deck;
a hydraulic double-action type dump cylinder operably coupled to the load carrying deck and configured to pivotally elevate the load carrying deck with an expansion action and to pivotally lower the load carrying deck with a contraction action;
a hydraulic pump for feeding pressure oil to an operational valve of the dump cylinder;
a bypass passage formed in the operational valve and configured to feed pressure oil from the hydraulic pump to the power steering device when the operational valve is under a neutral state; and
an oil feeding passage equipped with an orifice, the oil feeding passage being configured to feed the pressure oil from the hydraulic pump to a rod side oil chamber of the dump cylinder when the operational valve is under the neutral state.

2. The work vehicle of claim 1, wherein the orifice-equipped oil feeding passage is formed in the operational valve to connect the bypass passage with a cylinder port of the operational valve when the operational valve is under the neutral state.

* * * * *